United States Patent [19]

Michener, Jr.

[11] 4,258,064

[45] Mar. 24, 1981

[54] PREPARATION OF A NON-FAT NATURALLY SWEET YOGURT

[76] Inventor: Thomas S. Michener, Jr., 1055 Woods Rd., Southampton, Pa. 18966

[21] Appl. No.: 2,080

[22] Filed: Jan. 8, 1979

[51] Int. Cl.$^3$ .............................................. A23C 9/12
[52] U.S. Cl. ..................................... 426/43; 426/588; 426/650; 426/804
[58] Field of Search ................... 426/34, 43, 580, 583, 426/587, 588, 650, 804

[56] References Cited

U.S. PATENT DOCUMENTS

| | | | |
|---|---|---|---|
| 3,025,164 | 3/1962 | Metzger | 426/43 |
| 3,025,165 | 3/1962 | Metzger | 426/43 X |
| 3,128,190 | 4/1964 | Donay | 426/43 |
| 3,269,842 | 8/1966 | Mayer et al. | 426/43 |
| 3,969,534 | 7/1976 | Parey et al. | 426/34 |

OTHER PUBLICATIONS

Kosikowski, F. Cheese and Fermented Milk Fouds, Published by the Author, Ithaca, N.Y., 1966, pp. 47–50.

*Primary Examiner*—David M. Naff
*Attorney, Agent, or Firm*—Miller & Prestia

[57] ABSTRACT

A naturally sweet, fat-free yogurt that does not require additives such as gelling agents and thickeners is prepared by mixing water with about 22–37% by weight non-fat milk solids, heating the mixture to about 165°–185° F. for about 5–10 minutes to cause carmelization of the milk solids, cooling and inoculating the mixture with suitable lactic acid-producing microorganisms, filling the inoculated mixture into final containers, and incubating the inoculated mixture in the final container to produce yogurt.

12 Claims, No Drawings

PREPARATION OF A NON-FAT NATURALLY SWEET YOGURT

BACKGROUND OF THE INVENTION

The present invention relates to a starch-free cultured yogurt having a low fat content and to a process for the manufacture thereof. More specifically, the present invention relates to an improved shelf-stable when refrigerated, low-fat cultured yogurt product having greater natural sweetness and more non-fat milk solids than ordinary yogurts, with improved body, flavor, texture, smoothness, taste and appearance.

Yogurt is the product obtained when a milk solution is fermented with lactic acid producing microorganisms to the level of acidity which coagulates the solution and inhibits the further growth of the bacteria. To produce natural yogurt, a conventional yogurt culture such as *Lactobacillus bulgaricus, Lactobacillus acidophilus,* and *Streptoccocus thermophilus* is implanted in normal or modified milk and allowed to incubate until the bacteria establish the proper pH in the milk. After the proper pH is established and the yogurt jells, the product is chilled and kept in a protected container to inhibit the growth of undesirable microflora, that would produce spoilage. Yogurt must contain at least 0.6% acidity expressed in terms of lactic acid.

The benefits to be gained from eating yogurt culture are generally recognized, as for example, in its nutritional value and in the control of intestinal fermentation through the contribution of bacteria to the lower intestines which predominate over putrifactive microflora.

For the benefits of yogurt cultures to be realized, an effective amount of yogurt culture must be included in the diet daily. Generally, *L. bulgaricus,* the necessary organism for the production of yogurt but one which is unable to proliferate (or even survive) in the human bowel, is combined with another compatible bacteria such as *L. acidophilus* or *Str. thermophilus* to obtain the therapeutic effects. However, not all brands of yogurt currently on the market contain an effective amount of yogurt culture, the premixed or Swiss type being of particular note since the cultures in these are often deactivated by the processing.

A high quality yogurt contains, therefore, an effective amount of active culture along with beneficial nutrients such as protein, calcium, vitamins, is starch free and is low in butterfat. The texture of yogurt is also an important factor in determining its acceptance, for yogurt should be free of lumps or curds and exhibit a custard-like consistency until the set is broken and the whey is released.

Recently, the use of yogurt as a frozen dessert has become very popular because of its nutritional benefits over ice cream, for example. When yogurt is used frozen, it has, in many instances, had a sweetening agent such as sugar or saccharin added to it, to make it more similar to ice cream and other desserts. In these uses the proportion of high liquid and low solids content of ordinary yogurt has usually been retained with the result that the product tends to form into crystals when stored at or below freezing temperature for an extended period of time. Also, when yogurt is used as a soft frozen dessert, starches, non-fermented milk products and other additives or thickeners are often included in the product which may interfere with the effect desired from the fermented product, or may increase the calories per serving without necessarily increasing the nutritive value.

THE PRIOR ART

The usual process of preparing a base dairy product used for making yogurt includes the steps of blending milk (whole, fat free, skimmed, etc.) with water, cream or oil, etc., heating the mixture and holding it for pasteurizing, homogenizing at 1,000 to 2,000 p.s.i. See for example, U.S. Pat. Nos. 3,025,164 and 3,025,165 to Metzger and 3,969,534 to Pavey et al. Yogurt products made in the above manner are of the ordinary yogurt taste and require the addition of sugar, fruit and/or flavor components to obtain a more desirable flavor. Starches are also added to provide a better texture.

In order to utilize the prior art yogurt as a frozen dessert, it is necessary to add fillers such as gelling agents, starches, and thickeners, for example. While these additivies do not increase the butterfat content of the yogurt, many of them do add calories and carbohydrates to the product.

It has now been discovered that a naturally sweet yogurt can be obtained by using a dairy product base consisting of non-fat milk powder and water, mixed in certain proportions and heated to certain temperature for certain durations to cause a partial "caramelization" of the milk sugars in the solids. Pavey et al (U.S. Pat. No. 3,969,534) disclose proportions of milk powder to water and other ingredients for use in making prior art yogurt, but fail completely to disclose the necessary and critical proportions of milk and water, or the manner in which they are heated for obtaining the naturally sweet and very flavorful yogurt of this discovery. Furthermore, the yogurt in accordance with this invention can be more readily used in the preparation of a frozen dessert.

SUMMARY OF THE INVENTION

In view of the foregoing, it is the object of the present invention to provide a fat free and very flavorful yogurt product which is naturally sweet.

Another object is to provide a solid yogurt product which gives good support to added fruit and/or flavor components.

A further object of the present invention is to provide a high protein, low calorie yogurt product having a smooth, uniform texture, in which the liquid-to-solid proportion in the final product is low, which will permit rough handling without breaking the gel.

A still further object of the present invention is to provide a naturally sweet, non-fat, shelf-stable under refrigeration, yogurt completely without the use of artificial additives.

Another object of the present invention is to provide a vehicle containing a lower water to solids ratio for improving frozen yogurt products both in texture and nutrition.

Broadly, to achieve the above objectives, a mixture of non-fat milk solids and water is thoroughly combined and then heated to a temperature of 165°–185° F. to partially "caramelize" some of the milk sugars in the solids. After maintaining the solution at the above temperature for a duration depending on several factors, it is cooled to the standard incubation temperature, inoculated with proper bacterial mixture and incubated to the final product in the final container. The yogurt thus prepared can be utilized alone, with additional food or flavor ingredients or to prepare a frozen dessert.

It has also been found that mixture of some non-fat milk solids, powders and water require a change of technique to develop the naturally sweet flavor and firm texture which is the object of the invention. These powders require heating and "caramelizing" of only part of the dried milk and water mixture and using the remainder without heating.

DETAILED DESCRIPTION OF THE INVENTION

The present invention relates to a composition of and method for producing a naturally sweet, concentrated, low calorie, non-fat yogurt and to the product produced thereby, whether it is used as produced or used with food and/or flavor component additions, or in a frozen yogurt dessert.

The yogurt of the present invention may be readily prepared using as the base dairy product any conventional non-fat, dried milk of sufficient purity and "uncooked" composition, and water. The proportion of non-fat milk solids to water, which is critical in accordance with this invention, is in the range of 4 to 8 parts by volume of non-fat milk solids to 5 parts by volume of water (22–37% by weight based on the total weight of the product). Preferably, the proportion of milk solids to water is in the range of 5 to 6 parts by volume of milk solids to 5 parts of water by volume (27–32% by weight based on the total weight of the product), and more preferably, 6 parts of milk solids to 5 parts of water by volume (32%). The foregoing ranges are critical to the successful practice of this invention. Higher proportions of milk solids than 8 parts to 5 parts of water by volume result in the production of a syrupy mixture which cannot be heated easily and which cannot be incubated into yogurt over even a long period of time. Lower proportions of milk solids to water do not result in sufficient caramelization of sufficient milk sugars during the heating step utilized in the present process. Standard fluid milk equipment, including standard heating and cooling equipment for fluid milk may be used to carry out the method of this invention when the fluid milk product is prepared in accordance with the foregoing proportions.

Using the desired proportions, the milk solids are thoroughly mixed with the water by stirring, blending or by any available means for thorough mixing. The resultant mixture is then heated in a jacketed heating vessel, such as a double boiler might be used for small quantities, to a temperature of from about 160° to 180° F., preferably 165° F. When the desired temperature has been reached, it is maintained substantially for a period of about 2–10 minutes, the duration of which depends on at least two factors.

One of these factors is the concentration of solids in the liquid: when the concentration is high very little heating time such as 2–3 minutes is required, but when the liquid is more dilute the heating may require a 5–10 minute duration. The other factor that may affect the development of flavor in the product of this invention is the amount of heating that has already occurred in the process of making the non-fat dry milk powder. If the heating applied during this manufacture was excessive, such as 160° F. for 3 minutes for example, it may become difficult or impossible to develop the desired product flavor by the simple heat treatment described. It is highly desirable in the practice of this invention to use as a starting material a milk powder which, during the evaporation procedure has been heated to such a limited temperature for such a limited time that it has substantially no caramelization as determined by taste.

The action that occurs during the heating period of this invention, when both the foregoing factors are favorable, is to "caramelize" some of the milk sugars in the fluid. As this conversion makes some of the sugars unavailable to the micro-organisms, the sweetness is retained through the incubation thereby producing a naturally sweet flavor in the final product. Moreover, the caramelized milk solids are uniformly blended with the yogurt culture, adding sweetness and providing a caramelized flavor in a quantity sufficient for independent detection by taste.

Due to the differences in commercially available non-fat milk solids, it has been found that some mixtures of the non-fat milk solids and water require a change of technique to develop the naturally sweet flavor and firm texture which is the object of the invention. These powders require heating and "caramelizing" of only part of the dried milk and water mixture and using the remainder without heating. The ratio of the unheated portion to the heated portion may range from 0 to 100% depending on simple tests, and firmness and flavor desired in the finished product, but this change need not change the powder-to-water ratio.

Surprisingly, when a low proportion of non-fat milk solids to water is used in preparation of the base dairy fluid, the resulting yogurt product is not sweet, regardless of the amount of heating the fluid receives before being incubated. Similarly, if the heating step is omitted, the final product will have an ordinary yogurt flavor, no matter what concentration of solids is used in the base fluid.

After the heating step for flavor production is completed the fluid is cooled to the incubation temperature of 110° F., inoculated with an ample amount of a mixture of *L. bulgaricus* and *Str. thermophilus,* placed in the containers intended for the final product and their contents are incubated at the same temperature for about 4 hours.

The resulting yogurt product is naturally sweet, having a smooth, substantially solid texture, which, because it is thicker than conventional yogurt, provides better support for added fruits and flavor components. The final product also has a uniform consistency throughout the container.

The non-fat dried milk which is preferably used in preparing the fluid base for the present yogurt product is a commercially available material in powdered form that is almost instantaneously soluble. The use of alternative source materials such as skimmed milk, skim milk, evaporated milk, condensed milk and other, or mixtures of materials is also possible in practice, to achieve the density and flavor of the novel product of this invention.

If the product is to be flavored, it can contain from about 5 to 25% by weight of one or more flavoring bases, a fruit, a fruit base, a sweetener, a coloring agent, or any other food component as desired and recognized as conventionally compatible with such product. Such flavoring elements include, singly or in combination, chives, bacon, onion, blue cheese, pineapple, strawberry, apple, lime, plum, blackberry, peach black cherry, red raspberry, cherry, prune, lemon, blueberry, coconut, chocolate and sugars, or extracts of any of these. In many cases less of the flavoring component and less sugar or other sweetener will be required to furnish an acceptable product because of the nature of the flavor inherent in the present invention.

The yogurt is prepared above may also be treated to produce other yogurt products similar to those on the market such as frozen dessert, by for instance, stirring it under controlled low temperature conditions. Because the present product contains less water than normal yogurts, it will be found that less additives and thickeners such as sodium alginate, or gelatin will be required to make an acceptable finished product.

Although yogurt products prepared as above will rarely need fortifying, it is always possible to add stabilized dried cultures of lactic acid-producing bacteria of the type described in Porubcan et al U.S. Pat. No. 3,897,307.

The low fat yogurt product of this invention is of the type that is produced by natural, biological fermentation. The product of the present invention has exceptional consistency of such physical attributes as body, texture, flavor and appearance. The product of the present invention has a butter fat content of not greater than 0.5% of the solids, which corresponds to about 0.09% to 0.18% of the total product, by weight. If optional additives were to be included such as a thickener like sodium alginate, this would not exceed about 1.5%, or such as fruit and flavor components, these would not exceed about 25% by weight.

Since the novel yogurt is substantilly fat free, one recognized source of early spoilage is substantially eliminated.

The following Examples serve to illustrate more clearly certain particular ways of practicing this invention, but are not intended to limit the scope of the patent which is defined in the appended claims.

EXAMPLE I

A liquid non-fat milk product was prepared by mixing thoroughly, with stirring, 6 parts by volume of a commercially available, instant non-fat milk powder having a specific gravity of 0.39, and 5 parts by volume water, and heated to a temperature of about 165° F., in a jacketed vessel with some stirring. The liquid mixture was maintained at about 165° F. for about 3 minutes. A partial carmelization of some of the milk sugars was noted by taste. The mixture was then cooled promptly to the incubation temperature of 110° F. The fluid was then inoculated with about 6% by volume of a mixed culture in liquid form of *L. Bulgaricus* and *Str. thermophilus* obtained from a previous run. The fluid was then placed in final product containers, closed and incubated for 4 hours. The resulting product was then sealed and refrigerated at about 38° F. to inhibit bacterial growth.

The resulting yogurt product was sweet in flavor, was solid and smooth in texture, had a consistency similar to commercial pumpkin pie filling, and was able to withstand rough handling without harm.

EXAMPLE II

A yogurt product was prepared as in Example 1 but utilizing 4 parts of milk solids to 5 parts of water by volume and heated to 185° for 10 minutes.

The resulting yogurt product was light in weight compared to that of Example 1, had a free liquid in an amount small enough to enable the consistency to remain the same throughout the containers, was of a light natural sweetness, and had sufficient body to withstand rough handling without breaking the gel.

If desired an additional 1 part of milk solids may be added prior to incubation with the microorganism.

EXAMPLE III

A yogurt product was prepared as in Example I but utilizing 8 parts of milk solids to 5 parts of water by volume.

The resulting yogurt product was a fairly hard, moist, solid, similar to that of Example I but more dense, had no excess moisture and could be handled with little or no difficulty.

EXAMPLE IV

A yogurt product was prepared as in Example II and frozen while stirring at a temperature of 25°-30° F.

The resulting yogurt product had the appearance of frozen custard, was not as sweet as would be expected with ice cream but retained its smooth consistency. The product was free of water crystals after refrigeration for 48 hours at 24° F.

EXAMPLE V

A yogurt product was prepared according to the process of Example II and admixed with about 0.75% sodium alginate, together with sugar and extract of vanilla to taste, and frozen while stirring at a temperature of 25°-30° F.

The resulting product was uniformly smooth and had a flavor and texture similar to a frozen custard dessert.

COMPARATIVE EXAMPLE A

A yogurt product was prepared as in Example I but utilizing only 2 parts of milk solids to 5 parts of water by volume.

The resulting product was light in weight, had a normal bitter yogurt flavor, had a very delicate, easily broken gel with a high proportion of whey-like liquid.

COMPARATIVE EXAMPLE B

A yogurt product was prepared as in Example I but utilizing 3 parts of milk solids to 5 parts of water by volume.

The results were similar to those obtained in Comparative Example A.

I claim:

1. In a process for preparing a yogurt product having less than 0.5% butter fat content based on the weight of the solids by incubating an aqueous composition containing non-fat milk solids in the presence of lactic acid-producing microorganisms at a suitable incubation temperature, the improvement in which said non-fat milk solids are caramelized, said non-fat milk being caramelized by heating a mixture of water and about 22-37% by weight of non-fat milk solids, based on the total weight of the mixture, to a temperature of 165°-185° F. for a period of about 2-10 minutes, whereby the yogurt product which is prepared after incubation is naturally sweet.

2. The process according to claim 1 including the step of cooling the prepared yogurt product at a temperature of about 25°-30° F. while mixing so as to form a frozen dessert.

3. The process according to claim 2 including the step of adding sodium alginate to said yogurt product in an amount not exceeding 1.5% by weight of said yogurt product.

4. The process according to claim 1 in which the amount of caramelized non-fat milk solid in said aqueous composition is about 22% by weight based upon the total weight and said mixture is heated to a temperature of about 185° F. and maintained at said temperature for about 10 minutes.

5. The process according to claim 1 in which the amount of caramelized non-fat milk solid in said aqueous composition is about 31% by weight based upon the total weight and said mixture is heated to a temperature of about 165° F. and maintained at said temperature for about 5 minutes.

6. The process according to claim 5 including the further step of cooling the prepared yogurt product at a temperature of about 25°-30° F. while mixing, so as to form a frozen dessert.

7. The process according to claim 1 wherein said incubation temperature is 110° F.

8. The process according to claim 1 including the step of adding non-caramelized milk solids to said aqueous composition prior to incubation with said bacterial mixture.

9. A starch-free naturally sweet yogurt product having a butter fat content not greater than 0.5% based on solids content of the yogurt prepared according to the process of claim 1 wherein the sweetness of the yogurt product is provided solely by said caramelized milk solids and said yogurt product contains no added thickeners and gelling agents.

10. A starch-free frozen yogurt dessert having a butter fat content not greater than 0.5% based on solids content of the yogurt prepared according to the process of claim 2 wherein the sweetness of the yogurt product is provided solely by said caramelized milk solids and said yogurt product contains no added thickeners and gelling agents.

11. A starch-free naturally sweet yogurt product having a butter fat content of not greater than 0.5% based on the weight of the solids of the yogurt prepared according to the process of claim 8 wherein the sweetness of the yogurt product is provided solely by said caramelized milk solids and said yogurt product contains no added thickeners and gelling agents.

12. A process for preparing a naturally sweet, yogurt product having a butter fat content of not greater than 0.5% based on solids content of the yogurt comprising mixing thoroughly water with about 22-37% by weight of non-fat milk solids, the said percentage being based upon the total weight of the mixture, heating the mixture to a temperature of about 165°-185° F., maintaining the temperature of the heated mixture for about 5-10 minutes so as to cause caramelization to occur, cooling the heated mixture to a temperature of about 110° F., inoculating the cooled mixture with suitable lactic acid-producing microorganisms, filling the inoculated mixture into final containers, and then incubating the inoculated mixture in its final container for about 4 hours.

* * * * *